(12) United States Patent
Cheng et al.

(10) Patent No.: US 12,418,069 B2
(45) Date of Patent: Sep. 16, 2025

(54) POWER TOOL AND BATTERY PACK

(71) Applicant: Nanjing Chervon Industry Co., Ltd., Nanjing (CN)

(72) Inventors: Yugang Cheng, Nanjing (CN); Qiangqiang He, Nanjing (CN); Jianzhong Liu, Nanjing (CN); Jun Ji, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 18/636,492

(22) Filed: Apr. 16, 2024

(65) Prior Publication Data

US 2024/0405333 A1 Dec. 5, 2024

(30) Foreign Application Priority Data

May 31, 2023 (CN) .......................... 202310636827.0

(51) Int. Cl.
| | |
|---|---|
| *H01M 50/00* | (2021.01) |
| *B25F 5/02* | (2006.01) |
| *H01M 50/227* | (2021.01) |
| *H01M 50/231* | (2021.01) |
| *H01M 50/24* | (2021.01) |
| *H01M 50/247* | (2021.01) |
| *H01M 50/284* | (2021.01) |
| *H01M 50/296* | (2021.01) |

(52) U.S. Cl.
CPC .............. *H01M 50/24* (2021.01); *B25F 5/02* (2013.01); *H01M 50/227* (2021.01); *H01M 50/231* (2021.01); *H01M 50/247* (2021.01); *H01M 50/284* (2021.01); *H01M 50/296* (2021.01); *H01M 2220/30* (2013.01)

(58) Field of Classification Search
CPC .. H01M 50/24; H01M 50/231; H01M 50/247; H01M 50/277; H01M 50/284; H01M 50/296; H01M 2220/30; B25F 5/02
See application file for complete search history.

(56) References Cited

U.S. PATENT DOCUMENTS

| | | | |
|---|---|---|---|
| 11,145,929 B2 * | 10/2021 | Altenburger | ............. B25F 5/02 |
| 2013/0202665 A1 * | 8/2013 | Chiba | ................... A61K 8/022 |
| | | | 424/401 |
| 2014/0248519 A1 * | 9/2014 | Nishikawa | ........... H01M 50/24 |
| | | | 429/99 |

(Continued)

FOREIGN PATENT DOCUMENTS

CN 115702521 A 2/2023

*Primary Examiner* — Eyamindae C Jallow
(74) *Attorney, Agent, or Firm* — Greenberg Traurig, LLP

(57) ABSTRACT

A power tool includes a tool body, an electric motor disposed in the tool body, and a battery interface configured to be connected to a battery pack for supplying power to the electric motor. The battery pack includes a housing; and a cell module disposed in the housing. The cell module includes multiple cells; a cell holder configured to support the multiple cells; and a circuit board electrically connected to at least the multiple cells. The battery pack further includes a terminal assembly electrically connected to at least the circuit board or the multiple cells and connecting the cell module to the battery interface for electric power transmission; and a silicone immersion coating applied to at least the cell module.

19 Claims, 4 Drawing Sheets

(56) References Cited

U.S. PATENT DOCUMENTS

| | | | |
|---|---|---|---|
| 2014/0377622 A1* | 12/2014 | Glauning | H01M 50/247 |
| | | | 429/120 |
| 2015/0232699 A1* | 8/2015 | Fish | C08K 3/04 |
| | | | 524/588 |
| 2016/0293909 A1* | 10/2016 | O'Sullivan | B23B 49/00 |
| 2016/0329549 A1 | 11/2016 | Chatroux | |
| 2017/0365826 A1* | 12/2017 | Varipatis | H01M 10/425 |
| 2018/0301771 A1* | 10/2018 | Jennrich | H01M 50/209 |
| 2018/0366697 A1* | 12/2018 | Elfering | H01M 50/516 |
| 2019/0372182 A1* | 12/2019 | Takayasu | B60L 50/64 |
| 2020/0176731 A1* | 6/2020 | Taga | H01M 10/44 |
| 2020/0203682 A1* | 6/2020 | Bannai | H01M 10/0525 |
| 2020/0321576 A1* | 10/2020 | Nagahama | H01M 50/24 |
| 2021/0027677 A1* | 1/2021 | Jiang | H10K 50/86 |
| 2021/0139622 A1* | 5/2021 | Tanaka | C08L 23/20 |
| 2021/0147646 A1* | 5/2021 | Liu | B32B 5/022 |
| 2022/0181734 A1* | 6/2022 | Fassbender | H01M 10/425 |
| 2022/0223949 A1* | 7/2022 | Masumori | H01M 50/213 |

\* cited by examiner

POWER TOOL AND BATTERY PACK

RELATED APPLICATION INFORMATION

This application claims the benefit under 35 U.S.C. § 119 (a) of Chinese Patent Application No. 202310636827.0, filed on May 31, 2023, which application is incorporated herein by reference in its entirety.

TECHNICAL FIELD

The present application relates to an energy storage device and, in particular, to a power tool and a battery pack.

BACKGROUND

A battery pack is used as an energy storage device, and the production, usage safety, and service life of the battery pack are all common issues that need to be considered. For example, after the battery pack has been used for a long time, carbonization may occur on cell pole pieces and two ends of a cell. Alternatively, the battery pack used in a harsh environment has a relatively short service life.

This part provides background information related to the present application, which is not necessarily the existing art.

SUMMARY

A battery pack includes a housing; and a cell module disposed in the housing. The cell module includes multiple cells; a cell holder configured to support the multiple cells; and a circuit board electrically connected to at least the multiple cells. The battery pack further includes a terminal assembly electrically connected to at least the circuit board or the multiple cells and connecting the cell module to a power tool for electric power transmission; and a silicone immersion coating applied to at least the cell module.

In an example, the silicone immersion coating is applied to the entire cell module.

In an example, the circuit board is disposed on at least one end surface of the plurality of cells; and the silicone immersion coating is applied to the circuit board and an end surface of the multiple cells adjacent to the circuit board.

In an example, the cell module further includes a cell connector; one end of the cell connector is connected to at least two of the multiple cells, and the other end of the cell connector is electrically connected to the circuit board; and the silicone immersion coating is applied to at least the cell connector and the circuit board.

In an example, the silicone immersion coating is applied to the cell module at least by immersion.

In an example, the immersion time of the cell module in the silicone protective liquid is less than or equal to 2 minutes, so as to form the silicone immersion coating.

In an example, the immersion time of the cell module in the silicone protective liquid is less than or equal to 1 minute, so as to form the silicone immersion coating.

In an example, the thickness of the silicone immersion coating is less than or equal to 300 μm.

In an example, the thickness of the silicone immersion coating is less than or equal to 200 μm.

In an example, the silicone immersion coating includes spherical silicon dioxide.

In an example, the proportion of spherical silicon dioxide in the silicone immersion coating is less than or equal to 5%.

In an example, the silicone immersion coating includes methoxy terminated polydimethylsiloxane.

In an example, the proportion of methoxy terminated polydimethylsiloxane in the silicone immersion coating is greater than or equal to 35%.

In an example, the silicone immersion coating includes flame retardants.

In an example, the proportion of flame retardants in the silicone immersion coating is greater than or equal to 5%.

A battery pack suitable for a power tool includes a housing; a cell module disposed in the housing; and a terminal assembly configured to be connected to the power tool to transmit electric power. The rated voltage of the battery pack is greater than or equal to 5 V. The battery pack further includes a silicone immersion coating configured to cover at least the cell module.

A power tool includes a tool body; an electric motor disposed in the tool body; and a battery interface configured to be connected to a battery pack for supplying power to the electric motor. The battery pack includes a housing; and a cell module disposed in the housing. The cell module includes multiple cells; a cell holder configured to support the multiple cells; and a circuit board electrically connected to at least the multiple cells. The battery pack further includes a terminal assembly electrically connected to at least the circuit board or the multiple cells and connecting the cell module to the power tool for electric power transmission; and a silicone immersion coating applied to at least the cell module.

In an example, the silicone immersion coating is applied to the entire cell module.

In an example, the immersion time of the cell module in the silicone protective liquid is less than or equal to 1 minute, so as to form the silicone immersion coating.

In an example, the thickness of the silicone immersion coating is less than or equal to 300 μm.

DETAILED DESCRIPTION

Figure 1:
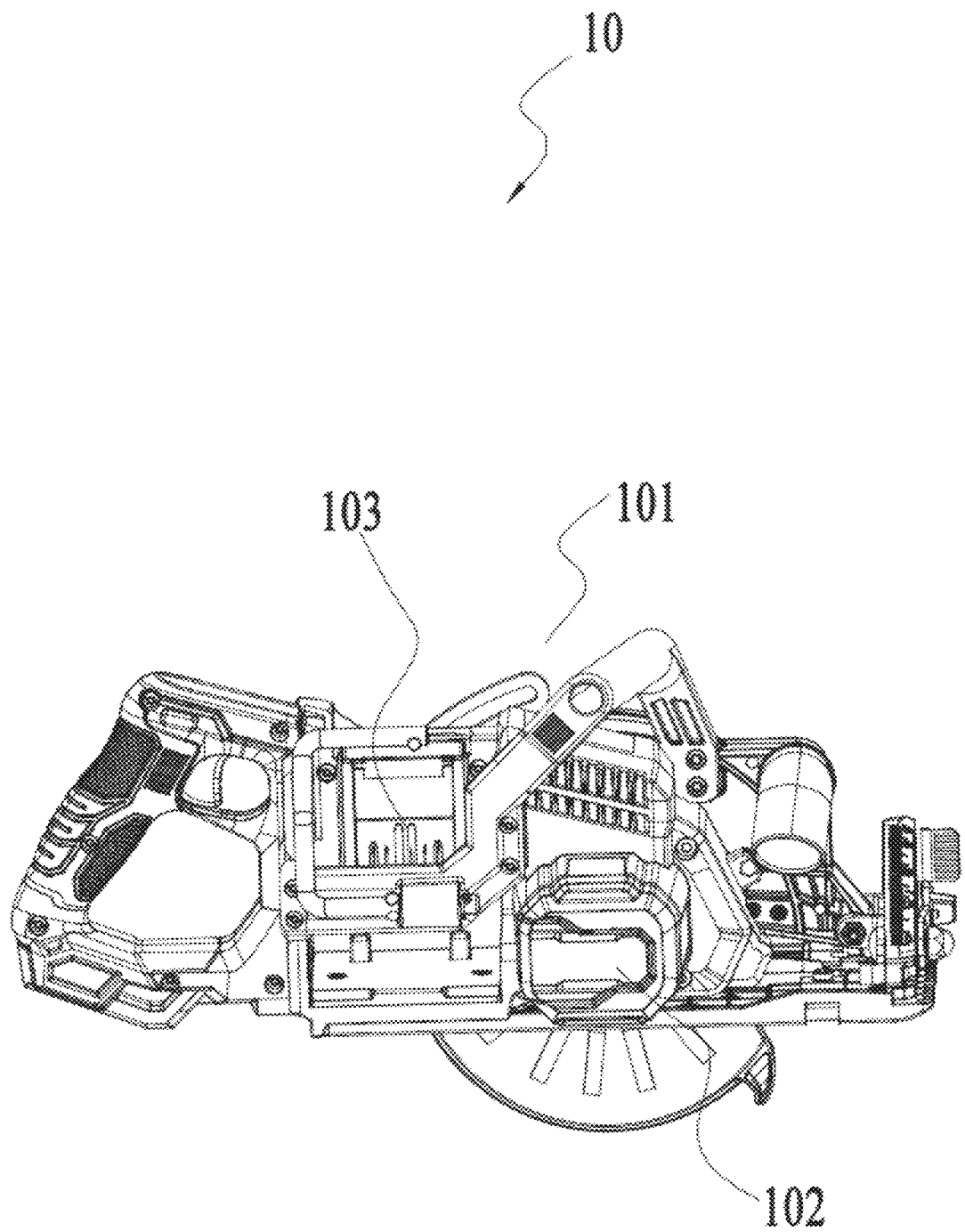
FIG. 1 is a structural view of a power tool according to an example.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

Referring to a power tool 10 shown in FIG. 1, the power tool 10 includes a tool body 101, an electric motor 102, and a battery interface 103. The battery interface 103 may be connected to a battery pack 20.

The battery pack 20 involved here can be adapted to various types of power tools 10. For example, the power tool 10 may be a handheld power tool, such as a drill, a hedge trimmer, or a sander. Alternatively, the power tool 10 may be a table tool, such as a table saw or a miter saw. Alternatively, the power tool 10 may be a push power tool, such as a push mower or a push snow thrower. Alternatively, the power tool 10 may be a riding power tool, such as a riding mower, a riding vehicle, or an all-terrain vehicle. Alternatively, the power tool 10 may be a robotic tool, such as a robotic mower or a robotic snow thrower. In some examples, the power tool 10 may be an electric drill, an electric lamp, an electric vehicle, or the like. In some examples, the power tool 10 may be a garden tool, such as a hedge trimmer, a blower, a mower, or a chain saw. Alternatively, the power tool 10 may be a decorating tool, such as a screwdriver, a nail gun, a circular saw, or a sander. In some examples, the power tool 10 may be a vegetation care tool, such as a string trimmer, a mower, a hedge trimmer, or a chain saw. Alternatively, the power tool 10 may be a cleaning tool, such as a blower, a snow thrower, or a washer. Alternatively, the power tool 10 may be a drilling tool, such as a drill, a screwdriver, a wrench, or an electric hammer. Alternatively, the power tool 10 may be a sawing tool, such as a reciprocating saw, a jigsaw, or a circular saw. Alternatively, the power tool 10 may be a table tool, such as a table saw, a miter saw, a metal cutter, or an electric router. Alternatively, the power tool 10 may be a sanding tool, such as an angle grinder or a sander. Alternatively, the power tool 10 may be another tool, such as a lamp or a fan.

In this example, the battery pack 20 may be a liquid lithium-ion battery with a polymer housing, a pouch battery, or a hard pack battery using hard materials as the battery housing. For example, the housing of the hard pack battery may be made of plastic, steel, or aluminum. The battery cells in the battery pack 20 may be cylindrical cells, square cells, or sheet cells. The battery pack 20 may be a lithium iron phosphate battery, a ternary lithium battery, a sodium-ion battery, or the like.

The rated voltage of the battery pack 20 may be greater than or equal to 5 V, greater than or equal to 12 V, greater than or equal to 20 V, greater than or equal to 24 V, greater than or equal to 30 V, greater than or equal to 36 V, greater than or equal to 40 V, greater than or equal to 45 V, greater than or equal to 50 V, greater than or equal to 56 V, or the like. The output power of the battery pack 20 may be greater than or equal to 20 W, greater than or equal to 30 W, greater than or equal to 40 W, greater than or equal to 50 W, greater than or equal to 60 W, greater than or equal to 80 W, or the like.

Figure 2:
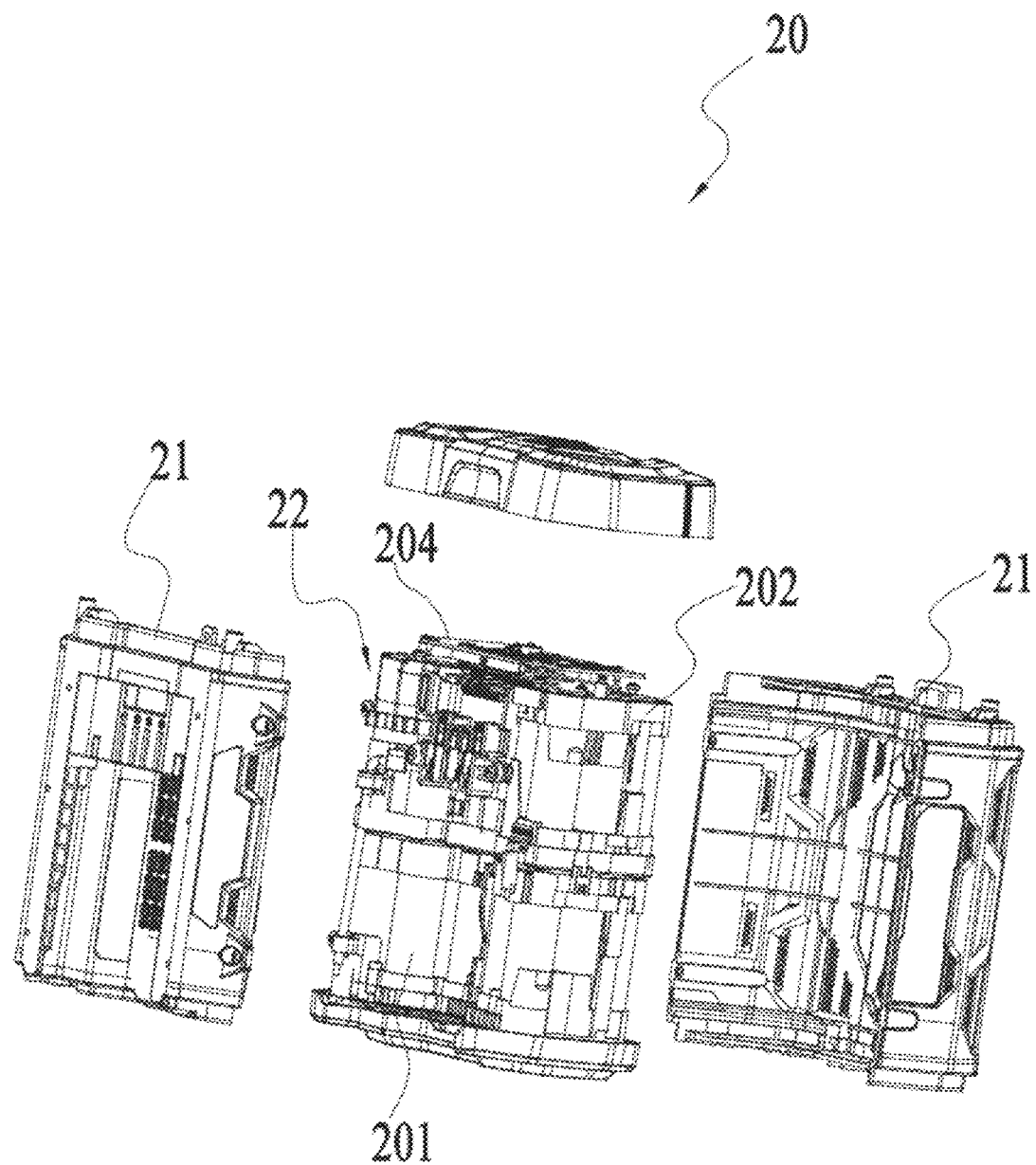
FIG. 2 is an exploded view of the partial internal structures of a battery pack according to an example.
Figure 3:
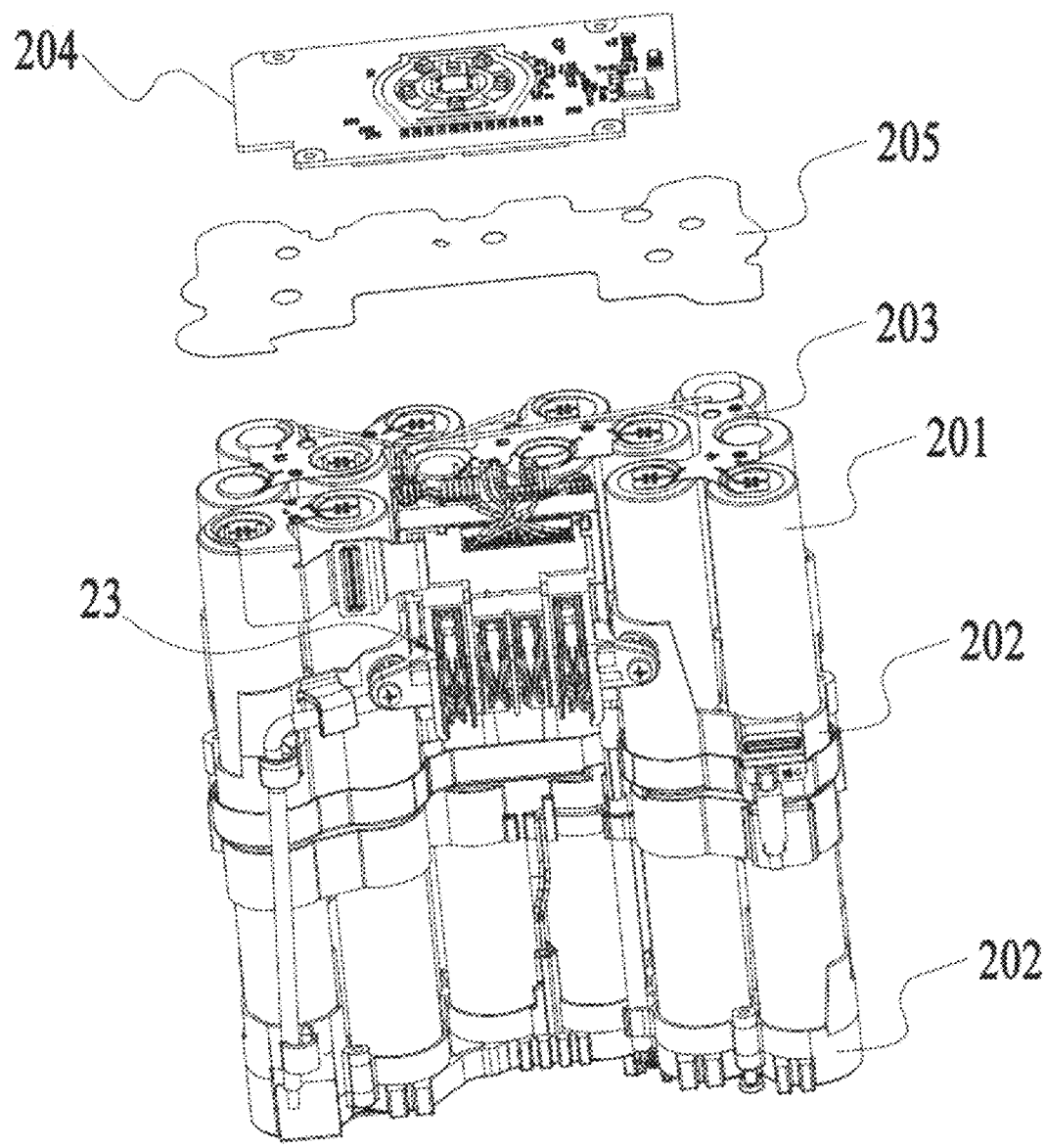
FIG. 3 is an exploded view of the partial internal structures of a battery pack according to an example.

Referring to the battery pack 20 shown in FIGS. 2 and 3, the battery pack 20 includes a housing 21, a cell module 22, and a terminal assembly 23. The cell module 22 includes multiple cells 201 and a cell holder 202 that supports the cells 201. It is to be noted that the cell holder 202 may be a holder with multiple accommodation cavities to accommodate the multiple cells 201, or the cell holder 202 may be a cell housing surrounding the cells 201. The cell holders 202 in different types of battery packs have different structures. In an example, the cell holder 202 may be partially exposed outside the battery pack 20, and the exposed part of the cell holder 202 and the housing 21 together form the outer surface of the battery pack 20.

In this example, the cell module 22 further includes a cell connector 203, and the cell connector 203 can connect at least two cells 201. Generally, cell connectors 203 are disposed on the positive and negative electrodes of the cell 201, respectively.

In this example, the cell module 22 further includes a circuit board 204. The cell 201 may be connected to the circuit board 204 through the cell connector 203, thereby transmitting the electrical parameters of the cell 201 to a battery management unit (not shown) on the circuit board 204. In this example, the circuit board 204 is disposed on one end surface of the cells 201; or the circuit board 204 is disposed along a direction parallel to the extension direction of the cells 201; or the circuit board 204 may be disposed at another position in the battery pack 20 without affecting the volume and performance of the battery pack 20. In this example, the cell connector 203 may be connected to the circuit board 204 by welding, where the welding may include at least any one of spot welding, line welding, surface welding, ultrasonic welding, or laser spot welding.

In this example, the terminal assembly 23 includes at least a positive terminal, a negative terminal, and a communication terminal. The terminal assembly 23 may be directly plugged into the circuit board 204 or may be connected to the circuit board 204 through a power cord. In this example, the manner in which the terminal assembly 23 is connected to the circuit board 204 is not limited. The circuit board 204 is connected to the terminal assembly 23 and may transmit the electric power from the cell module 22 to the power tool 10.

In terms of the battery safety design, the cell module 22 may further include an insulating member 205 shown in FIG. 3, such as electrical insulation paper, insulating glue, an insulating end cover, or an insulating oil seal. The insulating member 205 may cover the cell connectors 203 to prevent short circuits between the cell connectors 203. This safety setting ensures the safety of the battery to a certain extent, but in some special environments, the preceding safety design in the battery pack is destroyed by the environment, resulting in safety accidents. For example, if the battery pack is exposed to rain or moisture, the battery pack may catch fire and explode. In addition, during strict battery performance tests, safety problems such as battery carbonization or fire and explosion may occur even with the preceding safety design.

To solve the preceding problem, the present application performs a protective design on at least part of the structure of the cell module 22. For example, at least all positions with electrical connections in the cell module 22 are protected. For example, the end surface of the cell 201, the cell connector 203 on the end surface, the circuit board 204, and the like are protected.

Figure 4:
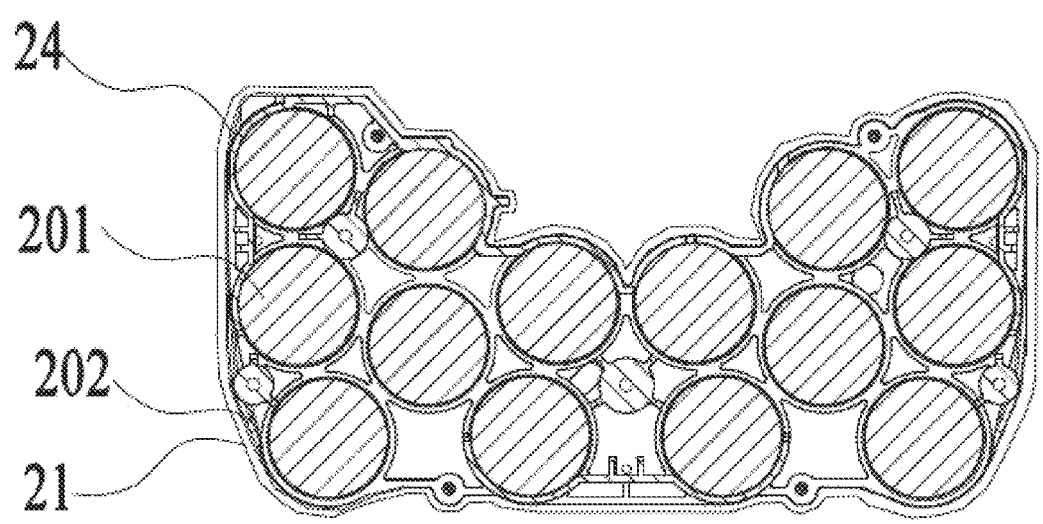
FIG. 4 is a schematic view of a cell module covered by a silicone immersion coating according to an example.

Referring to FIG. 4, in this example, the insulating member 205 is not provided in the battery pack 20. To make the electrical connections in the cell module 22 have better insulation, dustproof, moisture-proof, and other performances, a silicone immersion coating 24 may cover at least part of the structure of the cell module 22. Alternatively, the silicone immersion coating 24 covers the entire outer surface of the cell module 22. The stable and efficient performances of the silicone immersion coating in terms of being waterproof, being moisture-proof, being dustproof, corrosion resistance, electrical leakage prevention, component loosening prevention, insulation, and corona resistance are used to improve the protective performance of the battery pack, reduce the possibility of battery pack fire, and improve the battery pack safety. In an example, the entire battery pack 20 may be immersed in the silicone protective liquid, so as to form the silicone immersion coating.

In the present application, the silicone immersion coating 24 may be formed by immersing at least part of the cell module 22 in the silicone protective liquid, or spraying at least part of the cell module 22 with the silicone protective liquid, or using other surface coating technologies. The silicone protective liquid is a liquid protective material, and the composition may include at least spherical silicon dioxide, methoxy terminated polydimethylsiloxane, and flame retardants. In other examples, the silicone protective liquid may further include at least one of silicone diluent, a cross-linking agent, a coupling agent, a fluorescent indicator, a stabilizer, an antioxidant, and a catalyst. The proportions of different substances in the silicone protective liquid may be set according to actual requirements and are not limited here.

In an example, the configuration of various substances in the silicone protective liquid is shown in table 1 below.

TABLE 1

| Product name | Substances contained | Mass percentage |
| --- | --- | --- |
| Silicone protective liquid | Spherical silicon dioxide | ≤5 |
| | Methoxy terminated polydimethylsiloxane | ≥35 |
| | Flame retardants | ≥5 |
| | Silicone diluent | ≥40 |
| | Cross-linking agent | ≤5 |
| | Coupling agent | ≤5 |
| | Fluorescent indicator | ≤2 |
| | Stabilizer | ≤2 |
| | Antioxidant | ≤2 |
| | Catalyst | ≤2 |

In the present application, the environmental conditions and time conditions for forming the silicone immersion coating 24 covering the cell module 22 are limited to a certain extent. In an example, at least part of the structure of the cell module 22 may be immersed in the silicone protective liquid at normal temperature for an immersion time of less than or equal to 2 minutes, so as to form the silicone immersion coating 24. In an example, the immersion time is less than or equal to 1 minute. It is to be noted that the definitions of normal temperature are different in different technical fields. In this example, the temperature in the normal temperature environment is about 10° C., about 15° C., about 20° C., about 25° C., about 30° C., or the like.

The thickness of the silicone immersion coating 24 formed under the preceding conditions is less than or equal to 300 μm, less than or equal to 200 μm, or less than or equal to 150 μm.

In an example, the thicknesses of the silicone immersion coating 24 at different positions on the cell module 22 may be different. For example, the coating at the position above the end surface of the cell including the circuit board 204 is thicker than the coatings at other positions.

In an example, the silicone immersion coating 24 may be applied to the connection between the terminal assembly 23 and the circuit board 204.

In an example, the thicknesses of the silicone immersion coatings 24 of the cell modules in different battery packs may be different. For example, when at least one of the output power, the rated voltage, the volume, the housing material, the cell type, and the cell holder material of the battery packs is different, the thicknesses of the silicone immersion coatings 24 of the cell modules are different, or positions at which the silicone immersion coatings 24 cover the cell modules are different.

In an example, the silicone immersion coating 24 may cover the electronic components or the circuit board in the power tool 10.

The basic principles, main features, and advantages of the present application are shown and described above. It is to be understood by those skilled in the art that the preceding examples do not limit the present application in any form, and all technical solutions obtained through equivalent substitutions or equivalent transformations fall within the scope of the present application.

What is claimed is:

1. A power tool, comprising:
a tool body;
an electric motor disposed in the tool body;
a battery pack; and
a battery interface configured to be connected to the battery pack for supplying power to the electric motor,
wherein the battery pack comprises a housing and a cell module disposed in the housing, the cell module comprises a plurality of cells, a cell holder configured to support the plurality of cells, and a circuit board electrically connected to at least the plurality of cells, and the battery pack further comprises a terminal assembly electrically connected to at least the circuit board or the plurality of cells and connecting the cell module to the battery interface for electric power transmission and a silicone immersion coating applied to at least the cell module, and
wherein the silicone immersion coating is applied to the cell module at least by immersion.

2. The power tool of claim 1, wherein the silicone immersion coating is applied to an entirety of the cell module.

3. The power tool of claim 1, wherein the circuit board is disposed on at least one end of the plurality of cells, and the silicone immersion coating is applied to the circuit board and an end surface of the plurality of cells adjacent to the circuit board.

4. The power tool of claim 1, wherein the cell module further comprises a cell connector, one end of the cell connector is connected to at least two of the plurality of cells, and another end of the cell connector is electrically connected to the circuit board; and the silicone immersion coating is applied to at least the cell connector and the circuit board.

5. The power tool of claim 1, wherein an immersion time of the cell module in a silicone protective liquid is less than or equal to 2 minutes, so as to form the silicone immersion coating.

6. The power tool of claim 1, wherein an immersion time of the cell module in a silicone protective liquid is less than or equal to 1 minute, so as to form the silicone immersion coating.

7. The power tool of claim 1, wherein a thickness of the silicone immersion coating is less than or equal to 300 μm.

8. The power tool of claim 1, wherein a thickness of the silicone immersion coating is less than or equal to 200 μm.

9. The power tool of claim 1, wherein the silicone immersion coating comprises spherical silicon dioxide.

10. The power tool of claim 9, wherein a proportion of spherical silicon dioxide in the silicone immersion coating is less than or equal to 5%.

11. The power tool of claim 1, wherein the silicone immersion coating comprises methoxy terminated polydimethylsiloxane.

12. The power tool of claim 11, wherein a proportion of methoxy terminated polydimethylsiloxane in the silicone immersion coating is greater than or equal to 35%.

13. The power tool of claim 1, wherein the silicone immersion coating comprises flame retardants.

14. The power tool of claim 13, wherein a proportion of flame retardants in the silicone immersion coating is greater than or equal to 5%.

15. A battery pack suitable for a power tool, comprising:
a housing;
a cell module disposed in the housing; and
a terminal assembly configured to be connected to the power tool to transmit electric power,
wherein a rated voltage of the battery pack is greater than or equal to 5 V and the battery pack further comprises a silicone immersion coating configured to cover at least the cell module, and
wherein the silicone immersion coating is applied to the cell module at least by immersion.

16. A battery pack comprises:
a housing;
a cell module disposed in the housing comprising a plurality of cells, a cell holder configured to support the plurality of cells, and a circuit board electrically connected to at least the plurality of cells;
a terminal assembly electrically connected to at least the circuit board or the plurality of cells and connecting the cell module to a power tool for electric power transmission; and
a silicone immersion coating applied to at least the cell module, and
wherein the silicone immersion coating is applied to the cell module at least by immersion.

17. The battery pack of claim 16, wherein the silicone immersion coating is applied to an entirety of the cell module.

18. The battery pack of claim 16, wherein immersion time of the cell module in a silicone protective liquid is less than or equal to 1 minute, so as to form the silicone immersion coating.

19. The battery pack of claim 16, wherein a thickness of the silicone immersion coating is less than or equal to 300 μm.

* * * * *